United States Patent [19]

Jansson et al.

[11] Patent Number: 4,672,559

[45] Date of Patent: Jun. 9, 1987

[54] METHOD FOR OPERATING A MICROSCOPICAL MAPPING SYSTEM

[75] Inventors: Peter A. Jansson, Hockessin, Del.; Wade T. Rogers, West Chester, Pa.; James S. Schwaber, Wilmington, Del.

[73] Assignee: E. I. Du Pont de Nemours and Company, Wilmington, Del.

[21] Appl. No.: 686,795

[22] Filed: Dec. 26, 1984

[51] Int. Cl.$^4$ .................... G06F 15/626; G06K 9/00; H04N 7/18; G09G 1/14

[52] U.S. Cl. .................................. 364/525; 364/520; 340/705; 340/724; 340/734; 358/93; 382/6

[58] Field of Search ........................ 364/520, 525, 518; 382/48, 8, 6; 340/705, 709, 724, 734; 358/101, 107, 93

[56] References Cited

U.S. PATENT DOCUMENTS

| | | | |
|---|---|---|---|
| 4,202,037 | 5/1980 | Glaser et al. | 340/705 X |
| 4,259,725 | 3/1981 | Andrews et al. | 340/724 X |
| 4,315,282 | 2/1982 | Schumacher | 358/107 |
| 4,382,166 | 5/1983 | Kim | 340/709 X |
| 4,389,669 | 6/1983 | Epstein et al. | 358/107 X |
| 4,513,438 | 4/1985 | Graham | 382/6 |
| 4,523,188 | 6/1985 | Huber | 340/724 X |
| 4,531,120 | 7/1985 | Brownell et al. | 340/724 X |
| 4,567,515 | 1/1986 | Schumacher | 358/107 |
| 4,593,406 | 6/1986 | Stone | 358/101 |
| 4,618,934 | 10/1986 | Nagase | 364/507 |

OTHER PUBLICATIONS

Capowski and Sedivec, Computers and Biomedical Research 14, 1981, pp. 518-532.

Primary Examiner—Felix D. Gruber
Assistant Examiner—Joseph L. Dixon

[57] ABSTRACT

A "flying field" computer aided interactive microscopical mapping system has been developed that enables an operator to map over a region of the specimen covering many microscopical fields of view without the discontinuities associated with moving the stage and then generating mapping marks as separate and discrete operations. By fixing the mark generation point at a single location on the display device corresponding to the instantaneous intersection of the microscope's optical axis with the specimen stage, a trail of marks are produced that move in unison with the stage motion to remain superimposed with the viewed live specimen image. The points thus recorded are available for later display and analysis.

3 Claims, 21 Drawing Figures

FIELD OF VIEW A
(10 X OBJECTIVE)

TRACKING DISPLAY A

FIELD OF VIEW B
(10 X OBJECTIVE)

TRACKING DISPLAY B

FIELD OF VIEW C
(20 X OBJECTIVE)

TRACKING DISPLAY C

Fig. 2G

FIELD OF VIEW D
(20 X OBJECTIVE)

Fig. 2H

TRACKING DISPLAY D

Fig. 2I

FIELD OF VIEW E
(20 X OBJECTIVE)

Fig. 2J

TRACKING DISPLAY E

Fig. 2K

MAPPING DISPLAY

Fig. 3H
ERASE

Fig. 3I
QUIT

METHOD FOR OPERATING A MICROSCOPICAL MAPPING SYSTEM

BACKGROUND OF THE INVENTION

The present invention relates to computer aided interactive microscopical mapping in specimens viewed through a microscope.

A number of computer-aided microscope mapping instruments in the prior art involve optically combining the image of a video display with the live image from the microscope objective, such that when the operator looks into the microscope oculars he sees both images together, superimposed on each other. A cursor on the video display is typically controlled by the operator using a joystick or other graphic input device (GID). He can map information into the computer by moving the cursor over the viewed specimen and pressing a button to enter coordinates into the computer. Once all features of interest in the current field of view have been entered, he moves the stage and resumes mapping. It has been observed that the discontinuities associated with these "field hops" are very disruptive of the operator's sense of orientation within the specimen and of the continuity of data collection. For example, the system of Glaser and Van der Loos (U.S. Pat. No. 4,202,037) employs a configuration of computer and microscope, wherein the user controls, by means of the graphical input device (GID), the position of a "blinking X" on the display device. The position of the "blinking X" can represent, variously, the position on the display at which the user wishes to generate a mapping mark, or the selection of a system control command which is displayed on a dedicated portion of the display device. If the user wishes to place a mark over a location in the specimen outside the current field of view, he must first command the microscope stage to move such that the desired location is brought within the field of view, and then he must manipulate the GID in order to bring the "blinking X" over the location of interest. Finally, he must indicate, by pressing a button or by other means, that the system should record the current location of the "blinking X". The system does so, and simultaneously generates appropriate marks on the display in substantial coincidence with the specimen as an indication to the operator of the action taken. This method of microscopical mapping or sketching may be generically referred to as "moving cursor mapping with visual feedback." Thos skilled in the art will recognize that to map over a region of the specimen that covers many microscopical fields of view it will be necessary to move the specimen stage many times and as noted above the problems with discontinuities associated with these stage moves or "field hops" are very disruptive.

In this invention this problem is overcome by keeping the video cursor fixed at all times at the center of the microscopical field of view, and causing the stage to move under this cursor. Thinking of the cursor as the tip of his "pen", the operator instantaneously sees his "ink" in the form of luminous marks produced on the video display trailing behind the cursor as he roams freely throughout the specimen. Marks which leave the field of view are stored by means which allow them to be instantaneously and precisely redisplayed upon return to a previously mapped region.

SUMMARY OF THE INVENTION

The present invention itself comprises an improved method for a user to interact simultaneously with the computer means and the microscope in a computer-aided microscopical mapping system. More particularly, in the present invention, a microscope is employed which superimposes the images from a mapping display device and the specimen. The user employs a graphical input device to convey graphical or positional information to the computer. In response to this positional information input, the computer essentially simultaneously controls the position of the specimen stage, generates marks at a fixed location on the mapping display device, moves the previously generated marks with respect to the display, and produces numerical indicia. The positions of the marks on the mapping display device are moved such that the marks move in unison and in apparent coincidence with the image of the specimen as viewed by the user in the microscope oculars. Those marks which leave the visible window of the mapping display device are preserved in their proper relative positions and are redisplayed as required by the condition of coincidence of the marks with the previously mapped portions of the specimen. The numerical indicia comprise an accurate representation of the location and character of user-selected portions of the historical trajectory of the specimen stage. For reasons which will be made more apparent below, this method of interaction between the user and the computer/microscope system is referred to herein as "flying field mapping with visual feedback."

In operation, a drawing tube projects the image of the mapping display device into the microscope in such a way that its image appears to the user superimposed on that of the magnified specimen. Displayed on a monitor is a video cursor (a small cross hair) which appears at the center of the field of view. Also displayed on the monitor is an N×N pixel portion of a 2048×2048 pixel digital image memory which is called the mapping display window. The window size N is typically between 16 and 512 pixels and depends on the power of the objective selected.

The digital image memory is organized as 2048 rows by 2048 columns of pixels, each pixel represents 8 bits or 1 byte of storage. The operator defines a one to one correspondence between x and y dimensions of the specimen and column and row addresses in the image memory such that each pixel in the image memory corresponds to a unique Cartesian coordinate in the specimen. Storing a value in an image memory location corresponds to generating a mark on the mapping display.

In order to map, the operator manipulates the stylus of a graphics tablet, which transmits to the computer information on the distance and direction of the stylus motion. On the basis of this input, the computer does three principal things. First, it causes the microscope stage to move in a corresponding way. Second, it drives the mapping display window through the large image memory in such a way that the display appears to move in perfect registry with the live image of the specimen as viewed in the microscope. Third, it determines whether a button on the stylus has been depressed by the operator. If so, the computer then:

Records the current stage coordinates in a vector list in the computer's main memory.
Stores a value in the digital image memory.

Draws a line on the display from the location that previously was at the center of the field to the current center of the field.

It is important to note that since all data are captured from the optical axis of the microscope, the data are immune to corruption due to geometrical distortion in the mapping display device or in the optical system. The correspondence between stylus motion and stage motion is carefully chosen such that the user feels as though he is flying over the image of the specimen as in a helicopter. It is this fact which allows the user to perform highly detailed mapping in the context of a specimen whose dimensions are much larger than that visible within one microscopic field of view.

Digital control of the mapping display window size allows registration of the mapping display with the live image under several different microscope objectives of different magnifications. Means are also provided to map several discrete types of information using the color and shape attributes of the mapping mark to distinguish among them.

The principal advantage of this invention over the prior art method lies in its ability to rapidly map in a region of the specimen that extends over many microscopical fields of view without the discontinuities and inaccuracies associated with the requirement of moving the stage and then generating the mapping marks as separate and discrete operations. It will be appreciated also that, contrary to a "moving cursor" method of mapping, the "flying field" method of mapping avoids corruption of the geometrical data due to distortion inherent in the display device or in the optical system, due to the fact that the point of digitization remains fixed with respect to the optical axis.

The apparatus of the present invention comprises a computer with a memory for storing data, a manually-controlled graphical input device (GID) for manually conveying graphical information into the computer, a position-controlled specimen stage, a mapping display device with a visible window corresponding to the field of view (objective magnification), and a microscope where the optics therein produce a superimposition of the image of the specimen and the image produced by the mapping display device at the oculars of said microscope.

DETAILED DESCRIPTION OF THE PREFERRED EMBODIMENT

The Sketching System

Figure 1:
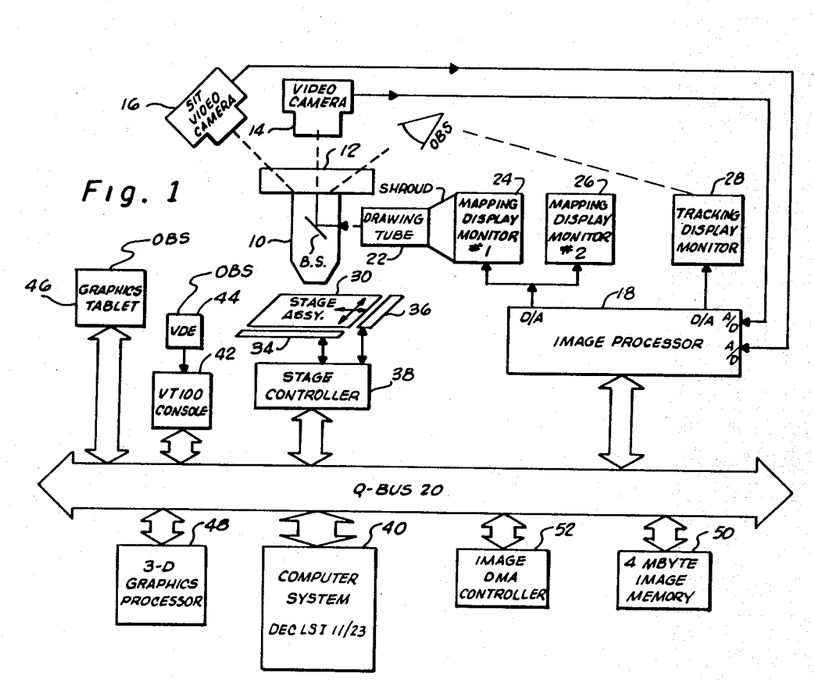
FIG. 1 is a block diagram of one embodiment of the system of this invention.

Referring to FIG. 1, the sketching system chosen for purposes of illustration includes a microscope 10, typically a Nikon Fluophot, with an ultrawide Optiphot head 12 that is modified for mounting two standard format video cameras 14, and 16 with the oculars. Video camera 14 is a DAGE/MTI model 68 silicon diode array vidicon, while video camera 16 is a DAGE/MTI Corporation model 66 with a silicon intensified target (SIT) tube for low light level sensing. The outputs of cameras 14 and 16 are connected to the analog to digital (A/D) input terminals of image processor 18, typically an Imaging Technology, Inc. IP512 system that includes 3 FB-512 boards, 2 AP-512 boards and an arithmetic logic unit (ALU) board. It communicates with the other components of the sketching system over the 22 bit Digital Equipment Co. (DEC) Q-bus 20. Image processor 18 functions to synchronize the input and output flow of digital image data, to digitize the analog camera output information, and to convert the processed digital data into analog form for viewing on the monitors. A drawing tube 22 with a beam splitter conveys the image appearing on a first mapping display monitor 24 into the microscope barrel to enable coincident viewing of both the magnified specimen and the corresponding mapping data. A second display monitor 26 is used to display the identical information as that projected by monitor 24. Both display monitors, 24 and 26 are high-resolution color monitors, (Mitsubishi Electronics of America Inc. model No. 3919), and are both connected to one of the output digital to analog (D/A) terminals of image processor 18. Connected to a second D/A output terminal is tracking display monitor, 28, typically a Sanyo Inc. black and white monitor. This monitor displays a low magnification static image of the complete section which remains fixed independent of the continuously changing mapping data displayed on monitors 24 and 26. In addition, the tracking display has superimposed on it a video marker, which indicates the instantaneous location and size of the higher-magnification field of view in the context of the specimen.

The microscope stage assembly 30 comprises a NIKON DIAPHOT stage on which are mounted two BURLEIGH Instruments Inc. IW-502 inchworm x,y micropositioners and EN-372 encoders 34, 36. Stage controller 38 comprises an INTEL Corporation model No. 8085 microprocessor for providing closed-loop control for both sets of positioners and encoders with I/O codes on a STD data bus. The microprocessor is also programmed to communicate with the host computer system 40 over the bus 20. The inchworm micropositioners enable the operator to rapidly and smoothly move the stage across its full range of travel. Typical performance yields 1.0 micrometer ($\mu$m) absolute accuracy on 2 axes bidirectionally over a range of 50 mm on each axis. Both axes are under simultaneous closed loop control, with position feedback derived from 1 $\mu$m linear optical encoders. Consequently, the stage can be moved and returned to its initial position with 1 $\mu$m accuracy and with no backlash. The communications interface with the host processor supports at least 150 coordinate pair updates per second.

Computer system 40 comprises: a DEC LSI 11/23, which includes a Q-bus; a 256 kbyte main memory; a DLV-11J quad serial data interface; a Data Systems Design, Inc. model No. DSD 880 30 Mbyte Winchester disk drive with a ½ Mbyte floppy disk; a Cipher Data Products Inc. M891, 9 track 3200 bpi cache streamer magnetic tape drive; a Microline printer manufactured by Okidata Corporation; a Hewlett Packard 7475A 6 pen plotter; and a DEC model No. DRV 11 parallel interface to the stage controller.

Communicating with computer 40 is a DEC model No. VT100 terminal 42 to which is attached an Interstate Electronics, a division of Figgie International Inc., model No. VRT-300 voice data entry unit (VDE) 44. Tactile input is provided by a graphics tablet 46, typically a Summagraphics Corporation model No. MM1201 with stylus. A three-dimensional (3-D) graphics processor 48, typically a Lexidata Corporation graphics processor, is used to display a 3-D reconstruction from a serial 2-D data set.

Image memory 50 and (DMA) data mover controller 52 (Image Analytics Corporation model QD512) are hardwired circuits that communicate directly with the I/O section of the host computer on the bus 20 to improve image data handling capacity and to speed up the display of image information on the monitors.

The image memory 50 comprises a stack of four addressable memory boards, each with a 1 Mbyte (8 bits per byte) capacity, to provide storage for a 4 Mbyte, 2048×2048 pixel image with full eight bits/pixel resolution.

The capacity of image memory 50 is used to advantage in the invention. In "flying-field" mapping, the capacity is available to store graphical mapping data which can cover large areas of the specimen at high resolution. Since the memory is organized by rows and columns, each memory cell is assignable, by virtue of its location within the memory, to a unique coordinate in the specimen. Mapping is then accomplished by storing assigned values in those memory cell locations that correspond with the trajectory of the mapping cursor over the specimen. Furthermore, the stored values are assignable from 8 bits (256 values) available and may be made to correspond with a unique color on the mapping display monitor 24.

Data mover controller 52 is a direct memory access (DMA) device capable of high speed transfer of data from a source location to a destination location on bus 20. Specifically, it perform the functions of pan, scroll, and zoom of the N×N pixel mapping display window within the 2048×2048 pixel image memory 50. This is of primary importance in our "flying-field" mapping concept, which requires that the mapping information stored in image memory 50 be made available to the mapping display monitor 24 in a rapid and continuous manner.

Tracking display monitor 28 displays a digitized video image captured by video camera 14 through a 1X objective. Subsequently, this image may be contrast enhanced by image processor 18 under operator control with the GID to vary brightness and gain. Upon initiating the mapping sequence, image processor 18 generates a video box superimposed on the tracking display, the size and position of which indicates the size and location of the microscope field of view seen by the operator. This is accomplished by varying the size of the box to reflect changes in the field of view with objective magnification, while the position of the center of the box remains fixed with stage position.

System Operation

To operate the "flying-field" mapping system, the operator initially positions the microscope 10 field of view over the specimen of interest with the aid of tracking display monitor 28. He does this by positioning stage assembly 30 via controller 38 using the graphics tablet and stylus 46, or the terminal 42, as the case may be. Once the specimen is in position, the operator can specify by VDE 44 or terminal 42 the magnification and type of objective lens, the color for the mapping mark, and whether the mapping is to be in the form of lines or location marks.

To initiate mapping, the operator presses a button on the stylus of the graphics tablet 46. Then as he moves the stylus over the graphics tablet, a stream of x,y coordinate pairs is transmitted to the computer system 40. Upon receipt of each new x,y coordinate pair input, the computer does the following:

- It causes the microscope stage to move in the directed way from its current position.
- It causes the datamover 52 to roam the mapping display window through the image memory 50, such that the marks on the mapping display monitors 24, 26 appear to move in perfect registry with the image from the specimen as viewed by the operator through the microscope oculars.
- It continuously updates the marker position on the tracking display to indicate the current location of the field of view in the context of the entire specimen.
- It continuously records the instantaneous stage coordinates in the vector list provided by the main memory and locates marks in the 4 Mbyte digital image memory 50.
- It draws a line on the mapping display from the last incremental center of the field of view (FOV) to the current center.

With boundaries and points mapped for a given specimen of a sequence of sections, the results may be cataloged by z-coordinate and sent to a 3-D graphics processor 48 along with similar data from the other specimens with different z-coordinate values. This data can then be rendered as an essentially 3-dimensional image representative of the original 3-dimensional sectioned structure.

Figure 2A:
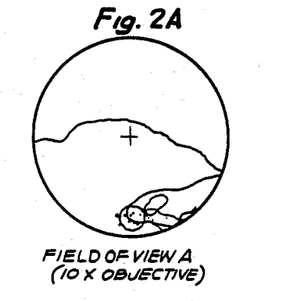
FIGS. 2A–2K are schematic diagrams of microscope views of an object on a stage illustrating the advantage of the method of the invention.
Figure 2B:
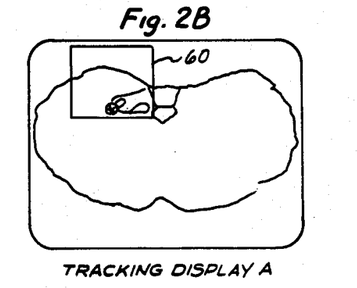
Figure 2C:
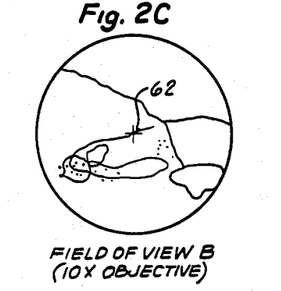
Figure 2D:
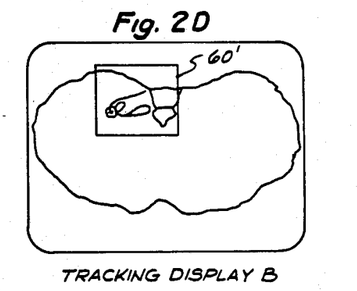
Figure 2E:
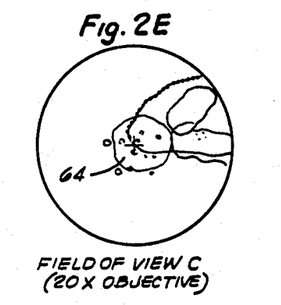
Figure 2F:
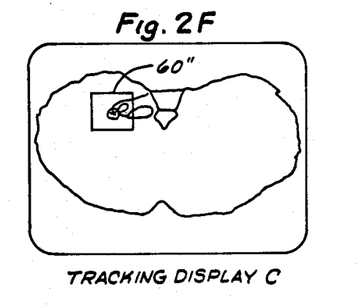
Figures 2G, 2H:
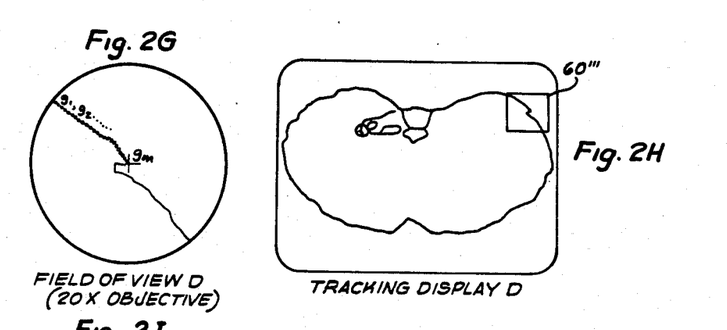
Figures 2I, 2J:
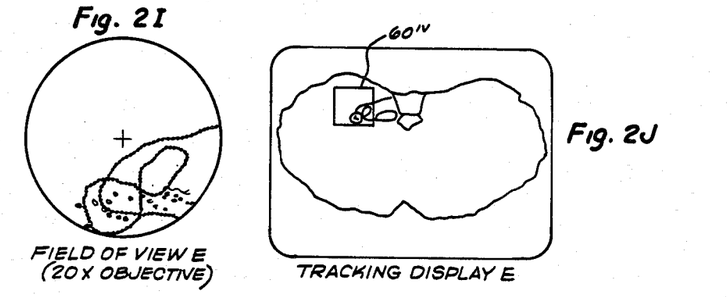
Figure 2K:
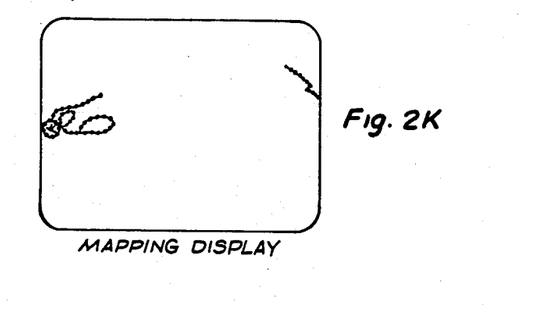

FIGS. 2A through 2K are used to exemplify the system operation. More particularly, each pair of FIGS. 2A, 2B; 2C, 2D; 2E, 2F; 2G, 2H; and 2I, 2J, represent a microscopic field of view and a tracking display for that field of view at the magnifications indicated below each illustrated field of view. FIG. 2K is the display of the data obtained from the following typical mapping sequence of operations as seen on the mapping display monitor 26.

Upon looking into the oculars, the operator may see an image such as FIG. 2A, and ask, "where am I?". Without changing magnification, he can lift his eyes from the oculars and see in the image displayed on the tracking monitor 28 (FIG. 2B) the location and extent of his FOV that appears outlined by the video box 60. He may then decide to map the features apparent in the lower right hand corner of FIG. 2A. By moving the stylus on the graphics tablet 46 downward and to the right, the field of view shifts accordingly (FIG. 2C). Then by enabling the mapping mark function, a mark is generated and appears as a dot 62 on the mapping display and in the microscope field of view superimposed with the image of the specimen. Note that the video box 60' of FIG. 2D has also moved to match the new coordinates of the FOV. As the operator continues to map the contour, he creates a series of dots, or lines (with the line mapping mode) that remain fixed in position with respect to the specimen (stage) coordinates. At any point, he may wish to change magnification to enable him to follow fine features such as the small contours 64 of FIG. 2E. When he does this, the position of the mapping marks are adjusted to remain aligned with the specimen, and the size of the video box 60" on the tracking display becomes smaller (FIG. 2F). Should the operator elect to map a remote feature, he is free to do so by positioning the FOV over the feature using his stylus while watching the tracking display video box 60''' (FIG. 2H) and commence mapping. He causes points $g_1 \ldots g_n$ (FIG. 2G) to be generated by depressing a button on the stylus as he moves the stylus in the direction selected. Should the operator wish to return the video box 60$^{iv}$ to the initial sketching position, (FIG. 2J), he is then able to instantaneously resume mapping the initial feature (FIG. 2I).

Having completed the mapping session, the operator obtains a readout from memory of the data points recorded from the specimen examined. Data output may be in hard copy form or visually displayed on the mapping display monitor (FIG. 2K). From a series of specimen mapped sections, one can assemble a 3-D figure of the mapped object using known techniques and analyze its structure.

DESCRIPTION OF FLOW CHARTS

The numbers preceding each paragraph refer to the numbered steps of the flow charts shown in FIGS. 3A-3H.

Figure 3A:
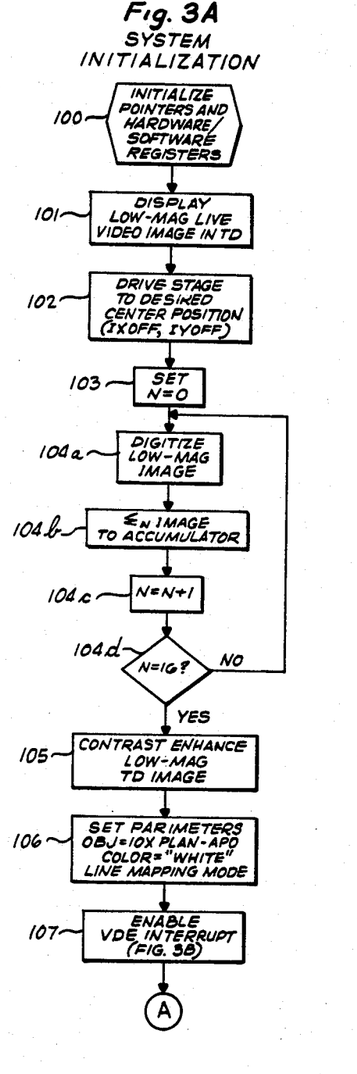
FIGS. 3A–3I represent a flow chart of a program for controlling the hardware components and managing a data base according to the invention.
Figure 3B:
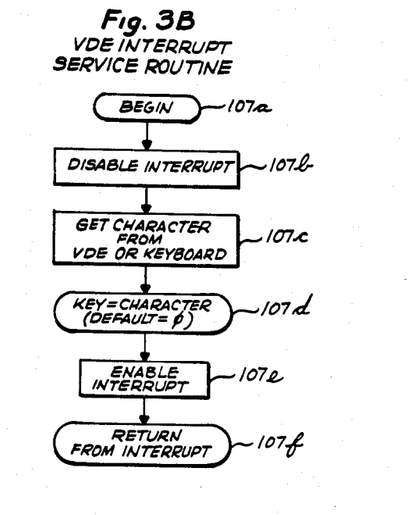

Referring first to FIGS. 3A and 3B is the initialization procedure that is completed for each stage mounted specimen, before mapping commences, where:

Step 100—restores both internal and external system pointers and registers to their proper initial conditions.

In Steps 101—through 105, the system allows the operator to acquire and optimize for viewing a low-magnification video image as a tracking display image. This image covers a substantial portion of the specimen.

Step 101—displays on monitor 28 a live video image sensed by camera 14 through a low-power microscope objective.

Step 102—In response to operator commands, drives the stage in such a direction that the desired region of the specimen image is centered in the tracking display monitor 28. Once centered, the position of the stage defines the x and y offset values (IXOFF, IYOFF) that are applied to subsequent stage positions before they are recorded in the vector list.

Steps 103 through 104d—perform image digitization and frame averaging at video rates to minimize statistical noise in the TD image.

Step 105—Enables the operator to optimize image contrast and brightness in the TD image.

Step 106—Specifies a set of default system parameters that includes: (a) microscope objective (magnification and type); (b) the color "ink" to be used with the mapping displays 24, 26 and (c) the line mapping mode (FIGS. 3C, 3D), rather than the mark mapping mode (FIGS. 3E, 3F).

Step 107—Enables a voice data entry (VDE) interrupt service routine that is further detailed in steps 107a through 107f in the flow diagram of FIG. 3B. This routine enables the operator to change the default conditions established in step 106 using the choices available to him from those listed in FIG. 3G. A particular ASCII character issued by VDE 44 in response to a recognized utterance is defined to represent one of the listed parameters.

Figure 3C:
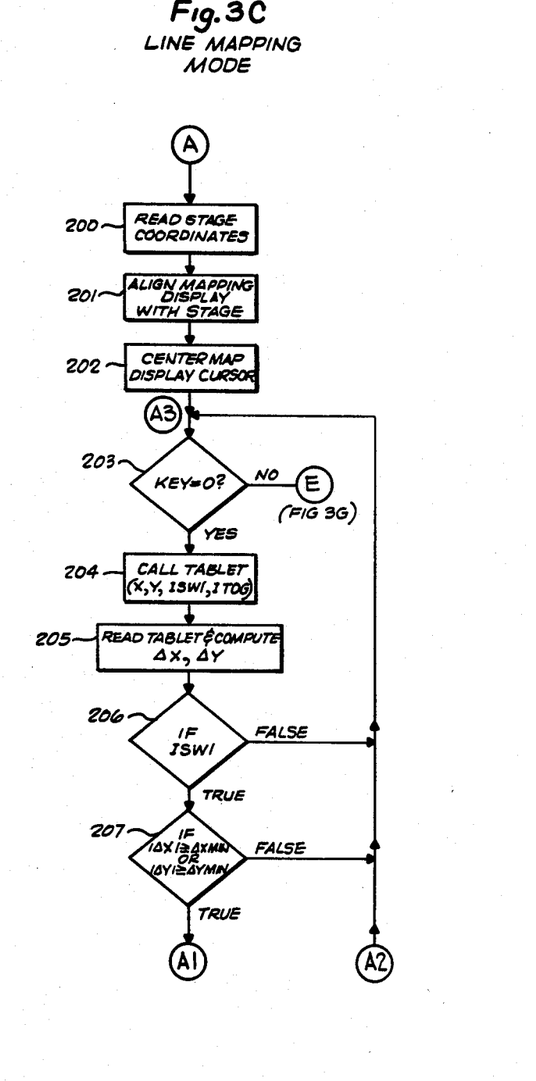
Figure 3D:
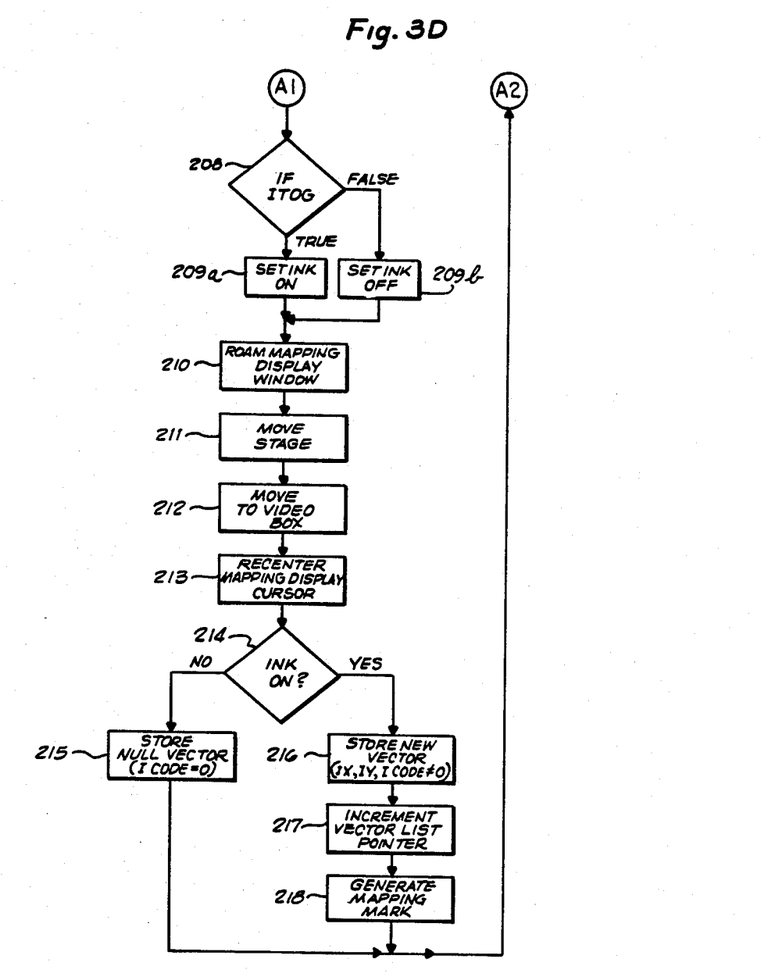
Figure 3E:
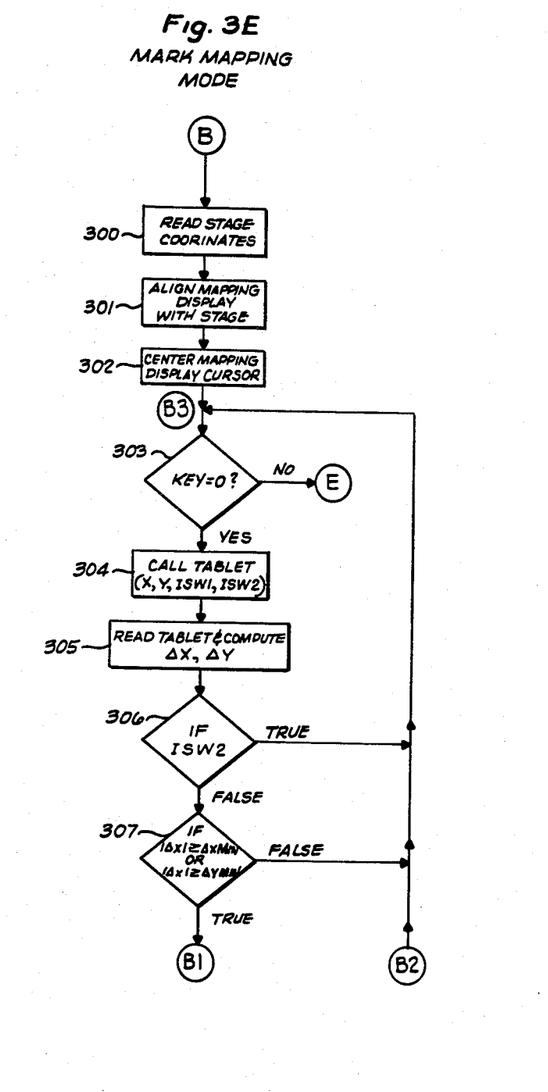
Figure 3F:
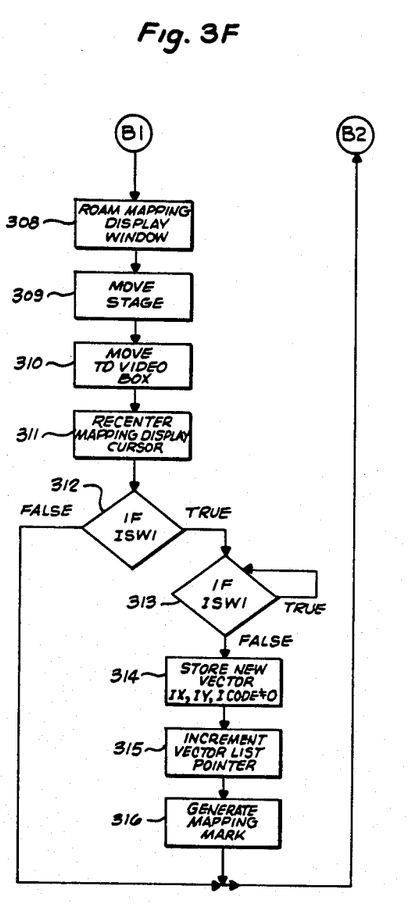

After initialization, the system defaults to the line mapping mode of FIGS. 3C and 3D, where:

Step 200—In response to a request from CPU 40, stage controller 38 returns the absolute x,y stage coordinates.

Steps 201 and 202—Taking into account IXOFF and IYOFF, apply the stage position coordinates to adjust the position of the mapping display window in digital image memory 50 so as to conform the mapping display image with the previously determined relationship between stage coordinates and digital image memory address. Any mapping marks previously entered will now align accurately with the image of the specimen as viewed through the microscope oculars.

Step 203—Checks for the existence of any parameter changes entered via VDE 44. If none exist, then—

Step 204—Calls graphics tablet 46 which returns the current stylus x,y position together with the current status of the stylus ISWI and ITOG switches. The 1,0 state of ISWI is controlled by tip pressure of the stylus against the graphics tablet surface, whereas ITOG is a logical variable (either "true" or "false") whose value is switched each time ISW2, (a switch located on the barrel of the stylus within reach of the operator's index finger) is depressed.

Step 205—Computes the difference between the current and previously recorded stylus positions to obtain a $\Delta X$, $\Delta Y$ data pair.

Step 206—Determines whether the stylus tip is depressed, and if so, then,

Step 207—Determines whether $\Delta X$, $\Delta Y$, or both are sufficiently large (if their absolute values are greater than prescribed $\Delta X$, $\Delta Y$ minima) for moving the stage. Should any of the above two tests fail, the algorithm returns to the top of Step 203 for another tablet reading. Continuing, Step 208—Checks the state of ITOG to determine whether the operator wants to map the current cursor position with luminous marks on the mapping display, or "INK", where, Steps 209a, b—Control the "INK" supply—Next, Step 210—Causes the $N \times N$ pixel mapping display window to roam through the image memory 50 (as controlled by DMA 52) in an amount and direction specified by the tablet $\Delta X$, $\Delta Y$. Recall that the size of N is dependent upon the objective lens magnification selected.

Step 211—Responds to the tablet $\Delta X$, $\Delta Y$ to move the specimen stage via stage controller 38, while Step 212—Moves the TD video box accordingly on monitor 28 via image processor 18. The TD video box is an indicator displayed over the low-magnification static image which shows the operator the position and size of his higher magnification microscopic field of view in the context of the specimen.

Step 213—Recenters the mapping display cursor in the field of view as a result of movement of the mapping display window in the $\Delta X$, $\Delta Y$ direction. This correction is accomplished by image processor 18.

Steps 214 through 218—Provide for (a) recording either a null vector vertex (IX, IY, ICODE=0) or a "new" vector vertex (IX, IY, ICODE≠0) in the vector list, (b) incrementing the vector list pointer and (c) generating a mapping line, before return to junction A3, located just before step 203. The vector ICODE parameter classifies a vertex into one of three categories:

ICODE=0 a null vector vertex (no length or direction)

$0 \leq$ ICODE $\leq 20$ a line vector vertex (origin or terminus)

$20 <$ ICODE $\leq 40$ a mark.

The color and shape of a line or mark is further defined by its position within the range to correspond with a particular mapped object.

Recycle time through the steps of FIGS. 3C, 3D is between 40 and 150 times a second.

FIGS. 3E and 3F cover the mark mapping mode algorithm which is similar in most respects to that of FIG. 3C, 3D. In contrast with the use of ISW1 and ITOG for controlling a continuous flow of "INK" for line mapping when the stylus tip is pressed against the tablet (controlled by ISW1); ISW1 and ISW2 are used to produce a mark.

Step 306—Allows ISW2 to act as a clutch. With ISW2 closed (true), the tablet is disengaged from its control functions, and when opened, (false), control is enabled.

Steps 307 through 311—are analogous to steps 207, and 210 through 213 of FIGS. 3C, 3D.

Step 312—Tests whether the stylus tip has been depressed against the tablet. If so, then Step 313 tests whether the tip has been lifted from the tablet, thus opening ISW1. If so then Step 314—Stores a new entry in the vector list with ICODE identifying it as a mark.

Step 315—Increments the vector list pointer, and

Step 316—Generates the appropriate mapping mark on mapping display monitors 24, 26.

Figure 3G:
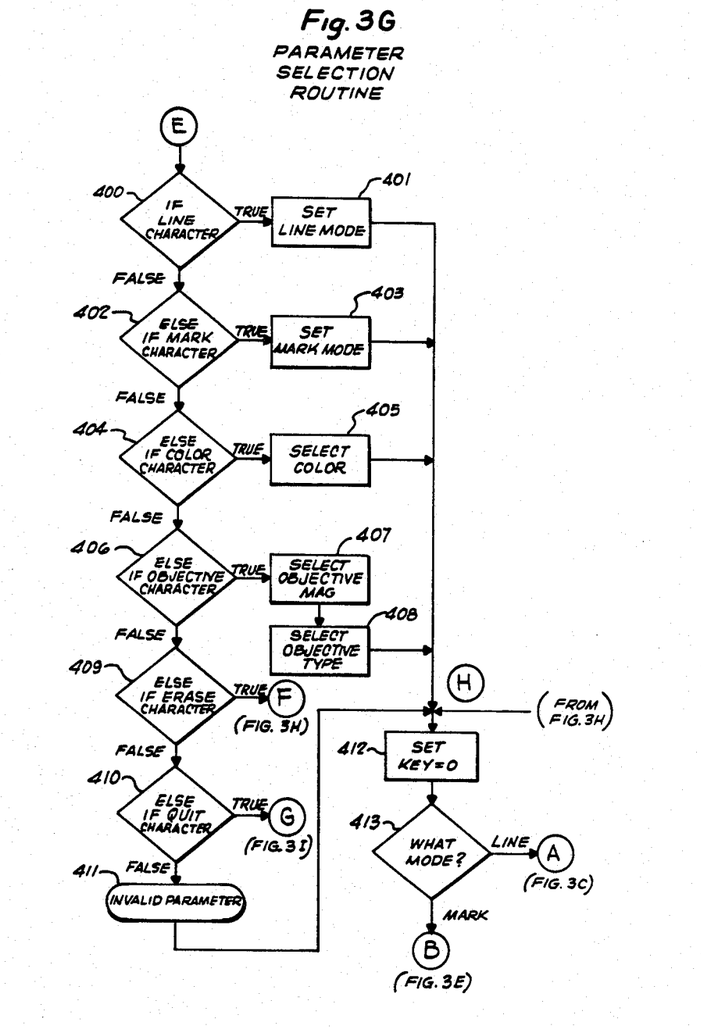

FIG. 3G as briefly mentioned earlier, contains the steps 400 through 411 that respond to the various parameter-specifying ASCII key characters. After an appropriate action has been selected, the flow passes to Node H and thence to step 412.

Step 412—Resets the value of KEY so that the system will be ready to intercept a new command character.

Step 413—directs flow to either the line mapping mode of FIG. 3C or the mark mapping mode of FIG. 3E.

Figure 3H:
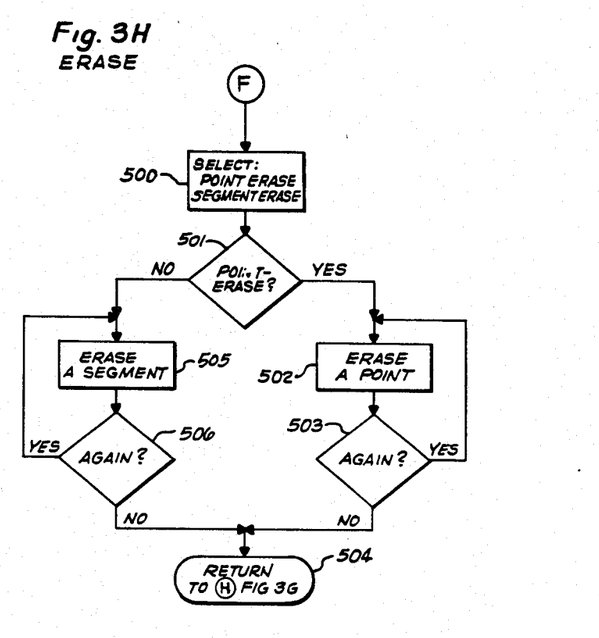
Figure 3I:
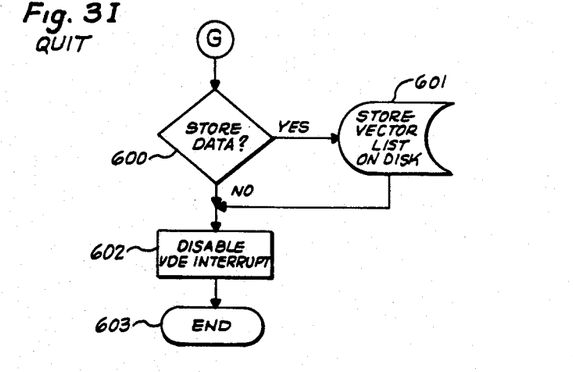

The erase and quit operations of steps 409, 410 appear in FIGS. 3H and 3I, respectively.

Step 500—Provides two erasing routines; point erase and segment erase. A "point" is either a single mapping mark or vector vertex that has been written onto the mapping display screen. A "segment" is either a contiguous sequence of vertices comprising a logical line segment, or a single mark.

Steps 501 through 504—Provide the steps for a point erase routine, while

Steps 505, 506, 504—Provide for segment erasure.

The QUIT routine of FIG. 3I provides the steps 600 through 603 needed to store data on disk and to disable the VDE interrupt.

Although the description has referred specifically to a light microscope embodiment, the principals of the method are applicable to such technology as electron microscopy, cartography, and photo imaging and analyses.

What is claimed is:

1. In a method of making a microscopic analysis that includes the steps of producing, by means of a microscope, an optical image of a specimen mounted on a position-controlled stage, superimposing the produced image with the image of a display device with a visible window and controlling the position of the stage by means of a graphic input device, the improvement comprising the steps of:

generating marks from a fixed point on the display device as controlled by means of the graphic input device;

defining said marks as x,y, coordinate axes pairs, that correspond to the instantaneous points of intersection of the optical axis with the specimen stage at the time the marks are generated; and moving the marks in unison with the specimen stage so that the marks move in apparent coincidence with the stage movement as viewed in the superimposed image.

2. The method as defined in claim 1 wherein the definition of said marks as x,y, coordinates provides a data base for a digital computer, said computer being programmed to manage the data base to preserve the coincidence of the marks with the viewed specimen image.

3. In a method of making a microscopic analysis that includes the steps of producing an image of a specimen mounted on a position-controlled stage within the field of view of a microscope, superimposing the produced image with the image of a display device with a visible window and controlling the position of the stage by means of a graphic input device, the improvement comprising the steps of:

(a) generating marks from a fixed point on the display device as controlled by means of the graphic input device;

(b) defining said marks as x,y,coordinate axes pairs, that correspond to the instantaneous points of intersection of the optical axis with the specimen stage at the time the marks are generated to provide a data base for a digital computer, said computer being programmed to manage said data base to preserve the coincidence of said marks with the viewed specimen image;

(c) moving the marks in unison with the specimen stage so that the marks move in apparent coincidence with the stage movement as viewed in the superimposed image;

(d) while concurrently displaying on a second display device a digitized static video image of a substantial portion of said produced image of said specimen;

(e) generating a visible marker on said second display device; and (f) moving the visible marker such that the size and location of the visible marker indicates the instantaneous size and location of the microscopic field of view.

* * * * *